United States Patent
Kim et al.

(10) Patent No.: US 7,998,368 B2
(45) Date of Patent: *Aug. 16, 2011

(54) AQUEOUS SOLUTION DISPERSEMENT OF CARBON NANOTUBES

(75) Inventors: Jae-Woo Kim, Newport News, VA (US); Cheol Park, Yorktown, VA (US); Sang H. Choi, Poquoson, VA (US); Peter T. Lillehei, Yorktown, VA (US); Joycelyn S. Harrison, Hampton, VA (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 198 days.

This patent is subject to a terminal disclaimer.

(21) Appl. No.: 12/272,826

(22) Filed: Nov. 18, 2008

(65) Prior Publication Data
US 2009/0134362 A1 May 28, 2009

Related U.S. Application Data

(60) Provisional application No. 60/990,122, filed on Nov. 26, 2007.

(51) Int. Cl.
*H01B 1/06* (2006.01)
(52) U.S. Cl. ......... 252/510; 977/746; 977/750; 977/752
(58) Field of Classification Search ....... 252/500–521.6, 252/510; 977/746, 750, 752
See application file for complete search history.

(56) References Cited

U.S. PATENT DOCUMENTS

| | | | |
|---|---|---|---|
| 6,569,841 B1 * | 5/2003 | Holmberg | 514/59 |
| 6,878,361 B2 | 4/2005 | Clarke et al. | |
| 7,098,056 B2 | 8/2006 | Demers | |
| 2005/0136048 A1 * | 6/2005 | Tsionsky et al. | 424/130.1 |
| 2006/0189822 A1 | 8/2006 | Yoon et al. | |
| 2007/0196722 A1 | 8/2007 | Tomita et al. | |

FOREIGN PATENT DOCUMENTS

WO WO 2007139936 A2 * 12/2007

OTHER PUBLICATIONS

Chen et al. "Noncovalent Sidewall Functionalization of Single-Walled Carbon Nanotubes for Protein Immobilization," J. Am. Chem. Soc., pp. 3839-3839 (2001).*
Jae-Woo Kim, et al., "Cobalt Oxide Hollow Nanoparticles Derived by Bio-templating," Chemical Communication, The Royal Society of Chemistry 2005, pp. 4101-4103.
Jae-Woo Kim, et al., "Electrochemically Controlled Reconstitution of Immobilized Ferritins for Bioelectronic Applications," Journal of Electroanalytical Chemistry 201 (2007), pp. 8-16.

* cited by examiner

*Primary Examiner* — Mark Kopec
*Assistant Examiner* — Jaison Thomas
(74) *Attorney, Agent, or Firm* — Linda B. Blackburn; Thomas K. McBride, Jr.

(57) ABSTRACT

Carbon nanotubes (CNTs) are dispersed in an aqueous buffer solution consisting of at least 50 weight percent water and a remainder weight percent that includes a buffer material. The buffer material has a molecular structure defined by a first end, a second end, and a middle disposed between the first and second ends. The first end is a cyclic ring with nitrogen and oxygen heteroatomes, the middle is a hydrophobic alkyl chain, and the second end is a charged group.

18 Claims, 1 Drawing Sheet

AQUEOUS SOLUTION DISPERSEMENT OF CARBON NANOTUBES

Pursuant to 35 U.S.C. §119, the benefit of priority from provisional application 60/990,122, with a filing date of Nov. 26, 2007, is claimed for this non-provisional application.

ORIGIN OF THE INVENTION

The invention was made in part by employees of the United States Government and may be manufactured and used by or for the Government of the United States of America for governmental purposes without the payment of any royalties thereon or therefor.

BACKGROUND OF THE INVENTION

1. Field of the Invention

This invention relates to methods of dispersing carbon nanotubes in solutions. More specifically, the invention is a method of aqueous solution dispersement of carbon nanotubes.

2. Description of the Related Art

Carbon nanotubes (CNTs) possess superior mechanical and electrical properties thereby making them a potential material of choice for a wide variety of applications. However, CNTs are not readily dispersed in a solvent because of substantial van der Waals attraction between CNTs. Unfortunately, dispersion of CNTs into individual tubes or small bundles of tubes in often desirable when another material is to be bonded to the CNTs. That is, if the CNTs can be dispersed prior to having a material bonded thereto, the resulting material tends to exhibit homogenous properties.

The choice of dispersing solvent must be compatible with the CNTs, the material being bonded thereto, and possibly the ultimate application environment. Ideally, the dispersing solvent is a water-based or aqueous system owing to water's low cost, ready availability, and non-toxic nature. Use of an aqueous dispersing solution is especially desirable in biomedical or biophysical applications. However, the hydrophobic nature of CNTs has made it difficult to disperse CNTs in an aqueous system.

To combat the CNTs aversion to dispersion in an aqueous system, surfactants or amphiphilic polymers are typically added to the aqueous system. Exemplary surfactants or polymers include sodium dodecyl sulfate (SDS), sodium dodecylbenzene sulfonate (NADDBS), TRITON X-100, TWEEN 20, PLURONIC P103, dodecyltrimethylammonium bromide (DTAB), DNA and polystyrene)-poly-(ethylene oxide) (Ps-PEO) diblock copolymer. CNT dispersion is stabilized as the surfactants wrap around the CNTs.

For dispersions requiring a high concentration of CNTs (i.e., higher than 0.1 mg/ml), the surfactant concentration required usually exceeds critical micelle concentrations to prevent re-aggregation of the CNTs after dispersion. However, most surfactants are not biocompatible and are difficult to remove from final products due to their strong adsorption onto the CUT surfaces. Also, surfactants hinder binding of reactants onto CNTs due to their tight wrapping of CNT surfaces. A low-power and high frequency sonicator is often utilized to make the suspension of CNTs with conventional surfactants. However, this process takes a long time (e.g., normally sonication for over 24 hours is required using this approach) to make a well-dispersed CNT suspension.

SUMMARY OF THE INVENTION

Accordingly, it is an object of the present invention to provide a method of dispersing CNTs in a solution.

Another object of the present invention is to provide a method of dispersing CNTs using an aqueous solution.

Still another object of the present invention is to provide a method of dispersing CNTs in an aqueous solution that supports subsequent binding of a reactant to the CNTs so-dispersed.

Other objects and advantages of the present invention will become more obvious hereinafter in the specification and drawings.

In accordance with the present invention, carbon nanotubes (CNTs) are dispersed in an aqueous buffer solution consisting of at least 50 weight percent water and a remainder weight percent that includes a buffer material. The buffer material has a molecular structure defined by a first end, a second end, and a middle disposed between the first and second ends. The first end is a cyclic ring with nitrogen and oxygen heteroatoms, the middle is a hydrophobic alkyl chain, and the second end is a charged group. CNTs are mixed in the aqueous buffer solution in a ratio of up to approximately 1.0 milligrams of CNTs per 1.0 milliliter of the aqueous buffer solution wherein a resulting solution includes the CNTs dispersed therein.

DETAILED DESCRIPTION OF THE INVENTION

The present invention is a method of dispersing carbon nanotubes (CNTs) in an aqueous solution without additives such as surfactants, polymers, etc., that tend to wrap about the dispersed CNTs. As used herein, the term CNTs includes single-wall CNTs (SWCNTs), few-wall CNTs (FWCNTs), multi-wall CNTs (MWCNTs), and mixtures thereof.

The present invention utilizes an aqueous buffer solution as the vehicle for CNT dispersion. As is known in the art, a buffer solution is an aqueous solution consisting of either a weak acid and its conjugate base, or a weak base and its conjugate acid. In either case, the property of a buffer solution is that its pH changes very little when a small amount of acid or base is added to it. Accordingly, buffer solutions are used to keep pH at a nearly constant value in various chemical applications.

Figure 1:
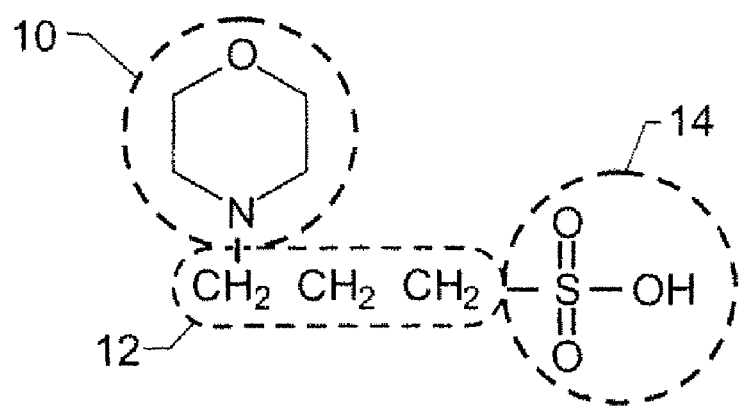
FIG. 1 is a molecular structure of 3-(N-morpholino)-propanesulfonic acid (MOPS) buffer material used in an aqueous buffer solution in accordance with the present invention.

As discussed above, dispersing CNTs in an aqueous solution has generally required an additive in order to overcome the hydrophobic nature of CNTs. Unfortunately, these additives wrap around the CNTs and prevent attachment of reactants (e.g., catalysts in the case of CNT-based electrodes) to the CNTs. The present invention overcomes these problems by use of an aqueous buffer solution that includes water, a buffer material, and possibly salt. The buffer material is defined generally by a molecular structure having a cyclic ring with nitrogen and oxygen heteroatoms at one end, a charged group at the other end, and a hydrophobic alkyl chain between and coupling the cyclic ring to the charged group. One such suitable commercially-available buffer material is 3-(N-morpholino) propanesultonic acid (or "MOPS" as it is known and will be referred to hereinafter). The molecular structure of the MOPS buffer is illustrated in FIG. 1 where the cyclic ring is contained within dashed-line circle 10, the alkyl chain is contained within dashed-line oval 12, and the charged group is contained within dashed-line circle 14. The alkyl chain 12 separates the hydrophobic cyclic ring 10 from the hydrophobic charged group 14. In general, a longer hydrophobic alkyl chain 12 improves CNT dispersion. For MOPS, the length of its alkyl chain is approximately 0.45 nanometers.

The aqueous buffer solution in the present invention comprises at least 50 weight percent water. The remaining weight percent of the aqueous buffer solution comprises a buffer material satisfying the above-described criteria and, optionally, a small amount of salt. When using the MOPS buffer material, good CNT dispersal was achieved when the weight percent of the MOPS buffer material was approximately between 1.05-50 weight percent.

The present invention's aqueous buffer solution can be mixed in accordance with well known solution making principles. That is, no special criteria need be adhered to when creating the solution. Once created, CNTs are added to the aqueous buffer solution. Based on dispersion analysis of a number of examples, good dispersion of CNTs resulted when the concentration of CNTs ranged up to approximately 1.0 milligrams per milliliter of the aqueous buffer solution. Initial mixing of the CNTs in the solution can be accomplished by stirring and/or sonication as would be understood in the art. In all test examples of the present invention, good dispersion of CNTs was visually evident after initial mixing with the clear aqueous buffer solution. That is, prior to mixing, the CNTs could be seen in aggregation in the clear solution whereas, after mixing, the entire mixture became opaque. Any subsequent aggregation of the CNTs was quickly re-mixed with just several minutes of sonication. Several examples of the present invention are detailed below.

EXAMPLE 1

The aqueous buffer solution in this example comprised 2.1 weight percent MOPS, 0.29 weight percent salt, and a remaining weight percent of water. The pH of this solution was 7.5. CNTs were mixed at a ratio of 0.5 milligrams/milliliter of the aqueous buffer solution.

EXAMPLE 2

The aqueous buffer solution in this example comprised 2.1 weight percent MOPS and a remaining weight percent water. No salt was added. The pH of this solution was 7.5. CNTs were mixed in at a ratio of 1.0 milligrams/milliliter of the aqueous buffer solution.

EXAMPLE 3

The aqueous buffer solution in this example comprised 26 weight percent MOPS and a remaining weight percent of water. No salt was added. The pH of this solution was 7.5. CNTs were mixed in at a ratio 3.0 milligrams/milliliter of the aqueous solution. Note that this higher ratio of CNTs did not yield good dispersion results.

EXAMPLE 4

The aqueous buffer solution in this example comprised 50 weight percent MOPS and a remaining weight percent of water. No salt was added. The pH of this solution was 7.5. CNTs were mixed in at a ratio of 0.5 milligrams/milliliter of the aqueous solution.

The advantages of the above-described CNT-dispersion method are numerous. The safe-to-handle aqueous buffer solution disclosed herein provides excellent CNT dispersion without use of additives that tend to wrap themselves about the CNTs. Thus, the present invention serves as a cornerstone for the assembly of reactant materials on CNTs. For example, the aqueous buffer solution with CNTs dispersed therein could further have a variety of biomolecules mixed therewith. In general, biomolecules carrying a positive charge on the surface thereof are ideally suited to bond with the dispersed CNTs. Thus, the present invention can serve as the building block for a number of biological or biophysical applications where CNTs serve as the vehicle for a particular biomolecule.

The present invention can also serve as the initial construction steps for fabrication of electrodes that use CNTs as their support. This can be accomplished by mixing metal-core ferritins with the above-described "aqueous buffer solution with CNTs dispersed therein". As will be explained further below, the ferritins are used to store nano-sized particles of metal. The ferritins have a natural affinity for the CNTs so that the stored nano-sized particles of metal can be distributed about the dispersed CNTs. This affinity can be enhanced by using cationized ferritins.

As is known in the art, ferritins are iron storage proteins involved in a variety of human, animal, and bacteria mechanisms. A ferritin molecule contains up to approximately 4500 $Fe^{3+}$ atoms (e.g., Fe(OH)) within its hollow interior. The ferritin molecule consists of a segmented protein shield with an outer diameter of approximately 7.5 mm. The protein shell consists of 24 protein subunits that form a spherical exterior with channels through which molecules can enter and leave the protein. When the protein shell is empty and contains no iron, it is called apoferritin. Using a reconstitution process of site-specific biomineralization within the protein shell, apoferritins can be loaded with different core materials to include good electrode materials such as cobalt, copper, gold, iron, manganese, nickel, palladium, platinum, platinum-ruthenium alloy, ruthenium, ruthenium-tungsten alloy, and silver. Ferritin reconstitution processes are disclosed by Jae-Woo Kim et al. in "Cobalt Oxide Hollow Nanoparticles Derived by Bio-templating," Chemical Communication, The Royal Society of Chemistry 2005, pp. 4101-4103, and by Jae-Woo Kim et al. in "Electrochemically Controlled Reconstitution of Immobilized Ferritins for Bioelectronic Applications," Journal of Electroanalytical Chemistry 601 (2007), pp. 8-16.

Figure 2:
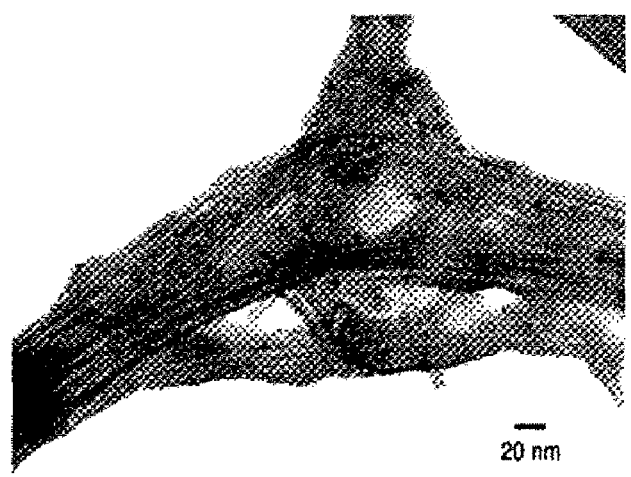
FIG. 2 is a "scanning transmission electron microscopy" (STEM) image of CNTs having a population of platinum-core ferritins embedded therein resulting from mixing the platinum-core ferritins in the aqueous buffer solution.

By way of example, naturally existing ferritins were reconstituted with nano-sized particles of platinum. Specifically, horse spleen ferritins were reconstituted with platinum having 200 atoms per ferritin using site-specific chemical reduction explained in the references cited herein. The resulting platinum-core ferritins were mixed into a version of the above-described solution (i.e., 2.1 weight percent MOPS and remaining weight percent water) with dispersed CNTs. The naturally existing ferritins have a negatively charged surface in a pH environment of 7.5 because the isoelectric point of the ferritin is around a pH of 4.5. As a result, a number of the supplied platinum-core ferritins were electrostatically repelled from the CNTs. Even so, this still yielded a distributed population of platinum catalyst on the CNTs as evidenced in the STEM image shown in FIG. 2 where the platinum-core ferritins appear as dark spots on the lighter-shade CNTs. For the illustrated example, the CNTs were purified FWCNTs mixed in the aqueous buffer solution at a ratio of 0.03 milligrams/milliliter. The ratio of FWCNTs to platinum-core ferritins was 1 to 1.47 in terms of weight. The total platinum loading in the solution was 44.3 micrograms.

Figure 3:
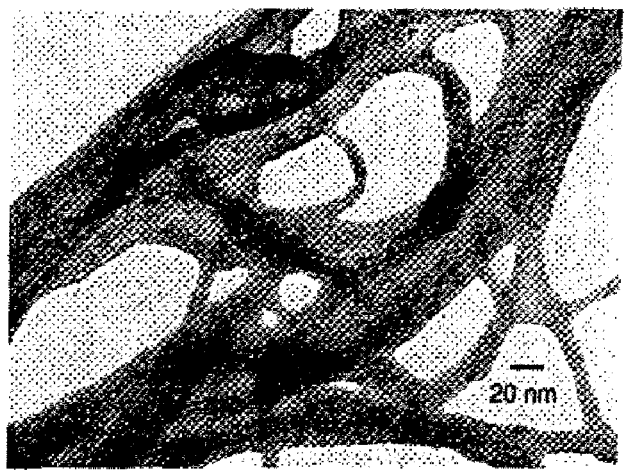
FIG. 3 is a STEM image of CNTs having a population of platinum-core cationized ferritins coupled thereto resulting from mixing the platinum-core cationized ferritins in the aqueous buffer solution.

It was discovered that the population of the platinum catalyst could be increased by using cationized ferritins in the reconstitution process as opposed to naturally existing ferritins. As is known in the art, a cationized ferritin has positive charges on the protein surface through modification with N,N-dimethyl-1,3-propanediamine (DMPA). Fabrication of the platinum-core cationized ferritins followed the same process as fabrication of the platinum-core ferritins. When platinum-core cationized ferritins were mixed in the above-described solution with dispersed CNTs, greater numbers of the platinum-core cationized ferritins easily attached themselves to the negatively charged CNT surfaces via electrostatic forces. As a result, an increased population of catalyst material (i.e., in the form of platinum-core cationized ferritins) could be found on the CNTs as evidenced in the STEM image shown in FIG. 3 where the platinum-core cationized ferritins appear as dark spots/regions on the lighter-shade CNTs. The solution with the dispersed CNTs for this example again comprised 2.1 weight percent MOPS and a remaining weight percent water. For this example, the CNTs were purified SWCNTs mixed in the aqueous buffer solution at a ratio of 0.083 milligrams/milliliter. The ratio of SWCNTs to cationized platinum-core ferritins was 1 to 0.4 in terms of weight. The total platinum loading in the solution was 33.3 micrograms.

The electrodes fabricated in the two examples just described were then tested. The electrocatalytic behavior for oxygen reduction was better for the electrode made with platinum-core cationized ferritins. Specifically, the electrode made with platinum-core cationized ferritins showed oxygen reduction that commenced at a lower voltage potential while producing about twice the current density when compared to the electrode made with platinum-core ferritins. In addition to these improvements, it was also discovered that subsequent sonication of the electrodes made with the platinum-core cationized ferritins (still in the aqueous buffer solution) caused dissociation of the ferritins, protein shell. This allowed the platinum particles to be redistributed and reorganize into non-spherical groups thereby defining greater surface areas of platinum catalyst. The result was further improvements in electrode performance with respect to starting potential of oxygen reduction and current density.

The advantages of the above described electrode fabrication method and resulting electrodes are numerous. CNTs are readily dispersed in a safe-to-handle aqueous buffer solution with the surfaces of the dispersed CNTs being available to react with a selected reactant. The use of ferritin proteins as the catalyst vehicle on a CNT support provides electrodes for both biofuel cell and fuel cell applications. This process involves safe-to-handle materials and is readily repeated using conventional mixing techniques. The catalytic effects of the resulting electrodes can be further enhanced by simple sonication to redistribute and re-shape the metal particles on the CNTs. Conversely, the use and retention of the ferritin proteins on the electrode can improve proton transport through the protein shield to thereby enhance the performance of the metal-core as a catalyst.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of dispersing carbon nanotubes (CNTs) in a solution, comprising the steps of:
    creating an aqueous buffer solution consisting of at least 50 weight percent water and a remainder weight percent that includes a buffer material having a molecular structure defined by a first end, a second end, and a middle disposed between said first end and said second end, said first end defined by a cyclic ring with nitrogen and oxygen heteroatoms, said middle defined by a hydrophobic alkyl chain at least approximately 0.45 nanometers in length, and said second end defined by a charged group;
    mixing CNTs in said aqueous buffer solution in a ratio of up to approximately 1.0 milligrams of CNTs per 1.0 milliliter of said aqueous buffer solution wherein a resulting solution includes said CNTs dispersed therein; and
    mixing metal-core cationized ferritins into said resulting solution.

2. A method according to claim 1, wherein said CNTs are selected from the group consisting of single-wall CNTs, few-wall CNTs, multi-wall CNTs, and mixtures thereof.

3. A method according to claim 1, further comprising the step of mixing biomolecules into said resulting solution, said biomolecules having positively charged surfaces.

4. A method according to claim 1, wherein said buffer material comprises 3-(N-morpholino)-propanesulfonic acid.

5. A method according to claim 4, wherein a metal used in making said ferritins is selected from the group consisting of cobalt, copper, gold, iron, manganese, nickel, palladium, platinum, platinum-ruthenium alloy, ruthenium, ruthenium-tungsten alloy, and silver.

6. A method according to claim 1, further comprising the step of sonicating said resulting solution.

7. A method of dispersing carbon nanotubes (CNTs) in a solution, comprising the steps of:
    mixing approximately 1.05-50 weight percent 3-(N-morpholino)-propanesulfonic acid with a remaining weight percent of water to form an aqueous buffer solution;
    mixing CNTs in said aqueous buffer solution in a ratio of up to approximately 1.0 milligrams of CNTs per 1.0 milliliter of said aqueous buffer solution wherein a resulting solution includes said CNTs dispersed therein; and
    mixing metal-core cationized ferritins into said resulting solution.

8. A method according to claim 7, wherein said CNTs are selected from the group consisting of single-wall CNTs, few-wall CNTs, multi-wall CNTs, and mixtures thereof.

9. A method according to claim 7, further comprising the step of mixing biomolecules into said resulting solution, said biomolecules having positively charged surfaces.

10. A method according to claim 7, wherein a metal used in making said ferritins is selected from the group consisting of cobalt, copper, gold, iron, manganese, nickel, palladium, platinum, platinum-ruthenium alloy, ruthenium, ruthenium-tungsten alloy, and silver.

11. A method according to claim 7, further comprising the step of sonicating said resulting solution.

12. A method of dispersing carbon nanotubes (CNTs) in a solution, comprising the steps of:
    creating an aqueous buffer solution consisting of at least 50 weight percent water and a remainder weight percent of a buffer material having a molecular structure defined by a first end, a second end, and a middle disposed between said first end and said second end, said first end defined by a cyclic ring with nitrogen and oxygen heteroatoms, said middle defined by a hydrophobic alkyl chain that is at least approximately 0.45 nanometers in length, and said second end defined by a charged group;

mixing metal-core cationized ferritins into said solution; and mixing CNTs in said aqueous buffer solution in a ratio of up to approximately 1.0 milligrams of CNTs per 1.0 milliliter of said aqueous buffer solution wherein a resulting solution includes said CNTs dispersed therein.

13. A method according to claim 12, wherein said buffer material comprises 3-(N-morpholino)-propanesulfonic acid.

14. A method according to claim 12, wherein said CNTs are selected from the group consisting of single-wall CNTs, few-wall CNTs, multi-wall CNTs, and mixtures thereof.

15. A method according to claim 12, further comprising the step of mixing biomolecules into said resulting solution, said biomolecules having positively charged surfaces.

16. A method according to claim 12, wherein said buffer material comprises 3-(N-morpholino)-propanesulfonic acid, and wherein said method further comprises the step of mixing metal-core cationized ferritins into said resulting solution.

17. A method according to claim 16, wherein a metal used in making said ferritins is selected from the group consisting of cobalt, copper, gold, iron, manganese, nickel, palladium, platinum, platinum-ruthenium alloy, ruthenium, ruthenium-tungsten alloy, and silver.

18. A method according to claim 12, further comprising the step of sonicating said resulting solution.

* * * * *